US011805473B2

(12) United States Patent
Breuer et al.

(10) Patent No.: US 11,805,473 B2
(45) Date of Patent: Oct. 31, 2023

(54) METHOD FOR DATA TRANSMISSION IN A CELLULAR NETWORK

(71) Applicant: THALES DIS AIS DEUTSCHLAND GMBH, Berlin (DE)

(72) Inventors: Volker Breuer, Boetzow (DE); Iavor Antonov, Berlin (DE)

(73) Assignee: TELIT CINTERION DEUTSCHLAND GMBH, Munich (DE)

( * ) Notice: Subject to any disclaimer, the term of this patent is extended or adjusted under 35 U.S.C. 154(b) by 273 days.

(21) Appl. No.: 16/470,422

(22) PCT Filed: Dec. 14, 2017

(86) PCT No.: PCT/EP2017/082888
§ 371 (c)(1),
(2) Date: Jun. 17, 2019

(87) PCT Pub. No.: WO2018/114617
PCT Pub. Date: Jun. 28, 2018

(65) Prior Publication Data
US 2019/0313323 A1    Oct. 10, 2019

(30) Foreign Application Priority Data
Dec. 19, 2016 (EP) .................................. 16204945

(51) Int. Cl.
*H04W 48/12* (2009.01)
*H04W 72/0453* (2023.01)
(Continued)

(52) U.S. Cl.
CPC ....... *H04W 48/12* (2013.01); *H04W 72/0453* (2013.01); *H04W 72/23* (2023.01); *H04W 74/006* (2013.01); *H04W 84/042* (2013.01)

(58) Field of Classification Search
CPC ............... H04W 48/12; H04W 72/042; H04W 72/0453; H04W 74/006; H04W 84/042
See application file for complete search history.

(56) References Cited

U.S. PATENT DOCUMENTS

2014/0010184 A1* 1/2014 McNamara ........... H04L 5/0039
370/329
2014/0362831 A1   12/2014 Young
(Continued)

FOREIGN PATENT DOCUMENTS

CN            103339894 A      10/2013

OTHER PUBLICATIONS

Office Action dated Dec. 3, 2020, by the Chinese Patent Office in corresponding Chinese Patent Application No. 201780084088.1. (13 pages).

(Continued)

*Primary Examiner* — Peter P Chau
(74) *Attorney, Agent, or Firm* — PEARL COHEN ZEDEK LATZER BARATZ LLP (57) ABSTRACT

The present invention relates to a method for data transmission in a cellular network for wireless communication, comprising at least one base node, to at least one user equipment camping on said base node, the method comprising the steps for the base node of: —transmitting in at least one frequency band at least two frame structure settings and one master information block, the master information block comprising data fields indicating to an access information channel for at least one of the frame structure settings in the frequency band, wherein the access information channel of a frame structure setting provides access information indicating to the part of the frequency band reserved to respective frame structure setting, —transmitting user relevant (Continued)

data in said part of the frequency band configured according to said frame structure setting.

12 Claims, 3 Drawing Sheets

(51) Int. Cl.
*H04W 74/00* (2009.01)
*H04W 72/23* (2023.01)
*H04W 84/04* (2009.01)

(56) References Cited

U.S. PATENT DOCUMENTS

| | | | |
|---|---|---|---|
| 2016/0212737 A1* | 7/2016 | Jang | H04L 5/0092 |
| 2017/0048802 A1* | 2/2017 | Bucknell | H04W 40/005 |
| 2017/0135099 A1* | 5/2017 | Song | H04W 16/02 |
| 2017/0163401 A1 | 6/2017 | McNamara et al. | |
| 2018/0007673 A1* | 1/2018 | Fwu | H04L 5/0092 |
| 2018/0213468 A1* | 7/2018 | Chatterjee | H04W 4/70 |
| 2019/0090284 A1* | 3/2019 | Kang | H04W 74/0833 |

OTHER PUBLICATIONS

Huawei Hisilicon: "Key Issues for Support of Network Slicing in RAN", 3GPP Draft; R2-167585, 3rd Generation Partnership Project (3GPP), Mobile Competence Centre, Nov. 2016, XP051177452, 5 pages, Retrieved from the Internet: URL:http://www.3gpp.org/ftp/Meetings 3GPP_SYNC/RAN2/Docs/.

Huawei Hisilicon: "Slice Availability and Discovery in RAN", 3GPP Draft; R2-167586, 3rd Generation Partnership Project (3GPP), Mobile Competence Centre, Nov. 2016, XP051177453, 3 pages, Retrieved from the Internet: URL:http://www.3gpp.org/ftp/Meetings 3GPP_SYNC/RAN2/Docs/.

International Search Report (PCT/ISA/210) and Written Opinion (PCT/ISA/237) dated Mar. 12, 2018, by the European Patent Office as the International Searching Authority for International Application No. PCT/EP2017/082888.

Pedersen, et al., "A Flexible Frame Structure for 5G Wide Area", 2015 IEEE 82nd Vehicular Technology Conference (VTC2015-Fall), IEEE, Sep. 2015, XP032856972, pp. 1-5.

Samsung: "E2E network slice: concept and requirements from RAN perspective", 3GPP Draft; R2-165282, 3rd Generation Partnership Project (3GPP), Mobile Competence Centre, Aug. 2016, XP051134165, 4 pages, Retrieved from the Internet: URL:http://www.3gpp.org/ftp/tsg ran/WG2 RL2/TSGR2_95/Docs/.

* cited by examiner

METHOD FOR DATA TRANSMISSION IN A CELLULAR NETWORK

CROSS-REFERENCE TO RELATED APPLICATIONS

This application is a National Phase Application of PCT International Application No. PCT/EP2017/082888, International Filing Date Dec. 14, 2017, claiming the benefit of European Patent Application No. 16204945.6, filed December 2016, which are hereby incorporated by reference.

FIELD OF THE INVENTION

The present invention relates to a method for data transmission in a cellular network. The invention also pertains to a base node using said method. The invention additionally relates to a user equipment using said method.

BACKGROUND OF THE INVENTION

In the field of wireless communication recent developments of standardization head in the direction of supporting more diverse user equipments operating in new generation cellular networks. Those diverse user equipments provide in particular different requirements towards the networks signalling capabilities. In particular in the field of 5G/new radio at least three scenarios for machine type communication (MTC) are already identified:
  mMTC (Massive Machine Type Communication): large number of devices with small data throughput for delay tolerant applications such as meters etc., designs to be low cost;
  uMTC (ultra-reliable Machine Type Communication): devices with extreme delay critical applications and corresponding authentication and security relevant data protection increasing overall throughput needs, data itself may be small but positioning and authentication additions increase it accordingly, alarm button, D2D, D2X;
  hDTD (high data throughput devices): Devices including M2M devices in automotive area where the 1 GBit needs to be achieved large data blocks combined via several frequencies technologies and carrier;

These requirements and potentially more are merely covered by a one-fits-all approach in the scheduling on the supported frequency bands. While by now the improvements of the cellular standard technology headed for improving the data throughput, for coming technologies this will not be sufficient, as long as it is not intended to maintain radio access networks over a multitude of generations, e.g. 2G, 3G, 4G, 5G . . . .

Therefore the problem is to solve, how for the different scenarios possible different scheduling solutions are coordinated and made available for the different user equipment expecting different scenarios. The straightforward approach of supporting one scheduling scheme for one scenario on one base node would lead to either coverage holes or a multiplication of efforts for rolling out the technology standard in the cellular networks by each scenarios. It can be seen that this is not efficient and will hardly pay out. Therefore a combination of scenarios on one base node needs to be achieved.

It is therefore the goal of present invention to overcome the mentioned disadvantages and to propose a solution for data transmission on base nodes supporting multiple scenarios.

Further alternative and advantageous solutions would, accordingly, be desirable in the art.

SUMMARY OF THE INVENTION

For this it is according to a first aspect of the invention suggested a method for data transmission to a user equipment according to some embodiments of the invention. It is further suggested according to a second aspect of the invention a base node according to some embodiments of the invention. It is further proposed according to a third aspect of the invention a user equipment according to some embodiments of the invention. It is further suggested according to a fourth aspect of the invention a cellular network according to some embodiments of the invention.

According to the first aspect of the invention it is suggested a method for data transmission in a cellular network for wireless communication, comprising at least one base node, to at least one user equipment camping on said base node, the method comprising the steps for the base node of:
  transmitting in at least one frequency band at least two frame structure settings and one master information block, the master information block comprising data fields indicating to an access information channel for at least one of the frame structure settings in the frequency band,
wherein the access information channel of a frame structure setting provides access information indicating to the part of the frequency band reserved to respective frame structure setting,
  transmitting user relevant data in said part of the frequency band configured according to said frame structure setting.

The proposed method relates to user equipment operating in a cellular network for wireless communication. The cellular network is preferably supporting a technology standard beyond present 4G standard, in particular 5G resp. New Radio (NR). The cellular network comprises at least one base node, preferably called eNodeB in 4G/5G. The base node represents the air interface to the user equipment situated in the cell area covered by a base node.

Each base node is configured to signal on at least one frequency band for downlink communication. Part of the at least one frequency band is the master information block, preferably situated in the center of the frequency band. The master information block at least comprises a broadcast channel, which broadcasts system information, which are received at least at the user equipments camping on the respective base node.

Additionally the base node is configured to apply at least two frame structure settings per supported frequency band in parallel. The frame structure setting relates to the configuration of data transmission in time resource blocks on at least a part of a frequency band supported by a base node. In another advantageous approach this does not only relate to the frame structure but also to the used coding, i.e. a certain block size is indicative for a used coding. Today there are different coding schemes such as LDPC or Polar intended for 5G having different performance for larger or smaller resource blocks.

In particular the at least two frame structure settings relate to one out of the group of scenarios of $5^{th}$ generation technology standard:
  massive machine type communication,
  ultra-reliable machine type communication,
  high-data throughput devices.

According to the inventive method each frame structure setting reserves a part of the frequency band, in particular an contiguous part. When more than one frame structure setting is available, each of the frame structure setting gets assigned a share of the subcarriers of the frequency band. Such share does not necessary be of equal size, this is advantageous as the probability of usage and information density per scenario is not equally distributed. E.g. for massive machine type information it is rather typical to have a rather low data throughput per user equipment.

Preferably the master information block, in particular the system information blocks, transmitted by the base node comprise an indication relating the availability of at least one of the frame structure settings.

This information is preferably part of an indication which of the frame structure settings are currently available.

The user equipments are preferably configured to support at least one of the frame structure settings. With this embodiment the user equipment gets a quick indication if the supported frame structure setting is currently available. Which subcarriers are reserved for which frame structure settings is submitted as part of the access information channel, preferably being transmitted among or adjacent to the subcarriers reserved for the respective frame structure setting.

The access information channel at least defines frame structure, size of resource blocks etc.

The master information block comprises an indication where in the frequency band the access information channel for a respective frame structure setting is situated. That is, when for a specific frame structure setting no such indication is available in the master information block, then the receiving user equipment has the information that said frame structure setting is currently not supported.

Per frame structure setting the user data are transmitted according to a specific transmission scheme different from the transmission scheme of at least one other frame structure setting used in parallel.

The transmission scheme in particular defines the coding scheme, size of resource blocks, HARQ delay requirements, TTI duration etc. Such transmission schemes are in particular designed for the supported scenarios for machine type communication, in particular mMTC, uMTC, and hDTD, as depicted above.

Each of the scenarios has different needs in terms of data throughput, reliability and allowed delay time. Instead of defining one common frame structure which would be a compromise for all supported scenarios, with the inventive method it is possible to specifically adopt the transmission scheme of a frame structure setting for the respective scenario. With the inventive method it is possible to support many of such frame structure settings resp. scenarios in parallel, which leads to the advantageous effect the e.g. both mMTC and uMTC devices may be served by one base node at the same time.

Preferably for at least one frame structure setting transmission scheme comprises at least one of:
  at least one structure block composed of a plurality of basic resource blocks,
  HARQ delay requirements for at least one of the uplink or the downlink transmissions.

The basic resource block refers to the resource block in particular as known in the legacy 4G transmission scheme, covering 12 subcarriers for a duration of 1 slot resp. 7 symbols (1 ms). According to the proposed embodiment a structure block of a respective transmission scheme may be composed of a plurality of basic resource blocks. This means in particular that in at least one dimension, time or frequency, the structure block is extended, in particular extended by one or more times the size of a basic resource block.

Further HARQ delay requirements are different for each frame structure setting. This may relate to the uplink or the downlink, and in particular comprise a reduced transmission time interval (TTI) for a. For an scenario related to a high data throughput the ACK/NACK feedback of the HARQ mechanism may be required in the next but one of said short TTIs. This leads to a comparably small roundtrip time (RTT) in ms. The data blocks have a large dimension in the frequency domain but only short in time domain and allowing with parallel processing very short HARQ response times. For the scenarios with resource blocks being designated for low end devices said blocks may be very large in time domain but small in frequency domain hence requiring less parallel processing. Even said HARQ response is preferably scheduled for next but 1 TTI. This allows more time for processing giving the larger dimension for the time domain of said blocks. This is acceptable for the envisaged MTC scenarios, as data reception here is not time critical.

Further additional scenarios may be developed in future standards, and it requires no material changes in the definition of the frame structure to support also such additional scenarios. Insofar the inventive method is basically agnostic towards the respective transmission schemes. Further a combination with existing LTE frame structure is possible.

When only a subset of the supported frame structure settings is currently available, this is indicated through the system information.

Consequently, if it is not available for the time being, such user equipment supporting only the missing frame structure setting are effectively barred from accessing the base node.

According to an advantageous embodiment said system information comprises an indication relating to barring user equipments supporting only a non-available frame structure setting.

This embodiment allows an easier identification that the base node is currently not serving such user equipments.

According to another preferred embodiment said indication additionally comprises an information about which base nodes in the proximity is supporting the missing frame structure setting. Such indication is preferably part of the neighbor cell list. In a first embodiment such information are static and indicate which of the neighboring base nodes is in principle capable of supporting a respective frame structure setting.

In an advantageous embodiment it is proposed that the information relating to the supported frame structure setting of the neighboring base nodes is updated regularly and should as such be up to date. Preferably self-optimizing network (SON) mechanisms are utilized for this task.

In another advantageous embodiment it is proposed that the system information further comprises an indication relating to the time when a non-available frame structure setting will be available.

The time information is in particular available when a data transmission scheduling is done in that way, that it is known by the base node by when certain activities of user equipments are due. In particular stationary user equipments, like metering devices or other applications out of the MTC field, have a regular schedule of data transmission. When the base node is aware—either by detecting such scheduling schemes by itself, or by an indication from the user equipments—of such scheduling scheme, it is in the position to inform via broadcasting of system information such time information.

A user equipment, in particular in the MTC field, which is tolerant about the time when data are exchanged, can in response to such information preferably decide if the indicated time is within the expected range and then wait until the required frame structure setting is available. If the indicated time is not acceptable then the user equipment has the choice to look for another suitable base node which supports the requested frame structure setting.

Such a neighbor base node may be indicated by the system information as well.

In another preferred embodiment it is proposed for the base node the step of transmitting system information, the system information comprising at least an indication that frame structure settings are available on request, and upon reception of a predetermined number of requests from user equipments relating to a specific frame structure setting configuring the respective frame structure setting.

According to this embodiment it is foreseen to decide about the supported frame structure setting of a base node in response to requests of user equipments. If the base node is open to such requests, this is preferably indicated with the system information.

Thus, user equipments which currently do not receive the supported frame structure setting consequently can request for the respective frame structure setting, preferably directly at the base node. When a predetermined number of requests from different user equipments for a specific frame structure setting are received, and in particular capacity is available, then the base node will activate the requested frame structure setting.

Preferably such activation is then announced as part of the time indication, in preparation of changing the allocation of subcarriers to the different frame structure settings.

Such on request management of frame structure setting is in particular handled beyond the base node level. According to this it is further proposed that the cellular network further comprises a reconfiguration server, operatively connected to a plurality of base nodes and to the core network of the cellular network,
the method further comprising the steps for the reconfiguration server of:
  receiving from at least one base node at least one message indicating reception of said requests from user equipments relating to a specific frame structure setting at said base node,
  instructing one of said plurality of base nodes to configure respective frame structure setting.

This embodiment proposes that on the cellular network side, in particular as part of the radio access network, a reconfiguration server is available. This reconfiguration server is in particular part of the mobile management entity (MME). The task of the reconfiguration server is to collect requests from user equipments which were received at the base nodes. Such request may in particular comprise that a user equipment with known preference resp. capability in regards to the supported frame structure setting is registered or camping on a base node. The preference or capability information are either transmitted directly upon registration and/or stored in the cellular network.

The base nodes are therefore advantageously relieved of such decision tasks. The reconfiguration server will then evaluate the received requests and instruct at least one base node about reconfiguring the currently supported frame structure setting.

Moreover the reconfiguration server is further in the position to distribute the user equipments requesting different frame structure settings from different base nodes nearby in that sense, that a plurality of base nodes are configured accordingly. In a densely populated area therefore at least two base nodes which are situated closely nearby are configured that way, that both base nodes support in parallel different frame structure settings. Hence, user equipments supporting a specific frame structure settings then have the base node that is appropriate for their needs in response to such a reconfiguration of the base nodes done by the reconfiguration server.

It is advantageous to assign the frame structure setting configuration task to a network component above the base node level, in order to have a bigger picture available. Further the reconfiguration server is able to instruct the reconfigured base nodes to indicate in its system information the at least one other base node that is capable of supporting the frame structure setting that its not supporting by the instructed base node.

According to the second aspect of the invention it is suggested a base node of a cellular network, configured to wirelessly communicate with at least one user equipment camping on the base node, wherein the base node is configured to transmit in at least one frequency band at least two frame structure settings and one master information block, the master information block comprising data fields indicating to an access information channel for at least one of the frame structure settings in the frequency band, wherein the access information channel of a frame structure setting provides access information indicating to the part of the frequency band reserved to respective frame structure setting, and the base node is configured to transmit payload data in said part of the frequency band scheduled according to said frame structure setting.

This embodiment relates to a base node being part of a cellular network. The cellular network is preferably supporting a technology standard beyond 4G/LTE. The base node is preferably an eNodeB. The cellular network comprises a plurality of base nodes each serving a cell area, and thus covering the coverage area of the cellular network.

The base node preferably comprises processing circuitry, volatile and permanent memory, transceiver circuitry and an antenna. The permanent memory holds computer programs for controlling the base node, which are executed at the processing circuitry. The base node is further connected to other components of the cellular network, in particular wired, and in particular to components of the radio access network, like the MME.

The second aspect of the invention shares the advantages of the first aspect of the invention.

According to a third aspect if the invention it is proposed a user equipment configured to camp on a base node of a cellular network, wherein the user equipment is configured to decode:
  signals transmitted by the base node in at least one frequency band in one of a plurality of frame structure settings, and
  a master information block, the master information block comprising data fields indicating to an access information channel for said frame structure setting in the frequency band,
wherein the access information channel of said frame structure setting provides access information indicating to the part of frequency band reserved to said frame structure setting, and the user equipment is further configured to receive user relevant data in said part of the frequency band scheduled according to said frame structure setting.

The user equipment according to this aspect of the invention is in particular a machine type communication (MTC) device. Said user equipment comprising processing circuitry, volatile and permanent memory and transceiver circuitry. Preferably the user equipment includes a communication unit comprising the transceiver circuitry and a separate processor for handling the tasks relating to the wireless communication with a base node. In a further processing circuitry the operating computer software, preferably stored in the permanent memory, of the user equipment is executed.

The user equipment is configured by means of the processing circuitry, transceiver circuitry and/or memory to operate with a base node according to the second aspect of the invention.

The third aspect of the invention shares the advantages of the first aspect. According to an advantageous embodiment it is proposed that the user equipment is further configured to receive system information transmitted by the base node indicating the availability of said frame structure setting, and to wait until the frame structure setting is available, in case the system information comprise an indication relating to the time when a non-available frame structure setting will be available.

This embodiment refers to a user equipment which is operating in a mode, where non-momentary data transmissions are handled. This in particular applies to MTC devices, which send regular information, like a metering device or another sensing device. For such user equipments it is not important to what actual time the data transmission is carried out. Hence, it is tolerant towards a delay of data transmission at least one of uplink or downlink.

In this situation, when a user equipment figures out from the system information broadcasted by the base node, that the supported or preferred frame structure setting is currently not available, then the user equipment is able to refrain from initiating the envisaged data transmission. In this situation the system information according to the preferred embodiment indicates by which time the non-available frame structure setting will be available.

Depending upon the time to go until the frame structure setting will be available the user equipment decides if it will be waiting said time, or if it will look for an alternative base node, which now or at least earlier than the present base node supports the requested frame structure setting.

This embodiment is advantageous as it gives the user equipment more options when the currently active base node does not support just at the request time the needed frame structure setting. For user equipments with long tolerance in terms of time until the data transmission is carried out, this could even mean that a change to another base node is not necessary due to the available frame structure settings.

According to a fourth aspect of the invention it is proposed a cellular network, comprising a plurality of base nodes, further comprising at least one reconfiguration server, operatively connected to a plurality of said base nodes and to the core network of the cellular network, wherein the reconfiguration server is configured to:
  receive from at least one base node at least one message indicating reception of said requests from user equipments relating to a specific frame structure setting at said base node,
  instruct one of said plurality of base nodes to configure respective frame structure setting.

This aspect of the invention relates to a cellular network which comprises a plurality of base nodes, according to the second aspect of the invention.

The cellular network further comprises a reconfiguration server.

Preferably the reconfiguration server is part of at least one MME. Preferably the cellular network comprises a plurality of reconfiguration servers, distributed over cell groups, like tracking areas. Each reconfiguration server is assigned to a number of base nodes.

According to this embodiment, the reconfiguration server receives information about user equipments requesting for a certain frame structure setting. There are various ways of receiving such requests, either by a direct request message, by the registration indicating capabilities of the user equipment etc.

The reconfiguration server has then the task to act as a broker between the assigned base nodes. It may further direct user equipments from one base node to another and thus distribute user equipments requesting different frame structure settings, in particular when situated in densely populated areas closely nearby.

In that sense the fourth aspect shares the advantages of the respective embodiment of the first aspect of the invention.

As it is shown this invention advantageously solves the depicted problem and provides means for supporting different scenarios on one base node, without any drawback in terms of matching the specific requirements of each scenario. Further the user equipments get enough of information to assure that even in case of limited supported frame structure setting the user equipment can be served in a timely manner.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

Figure 1:
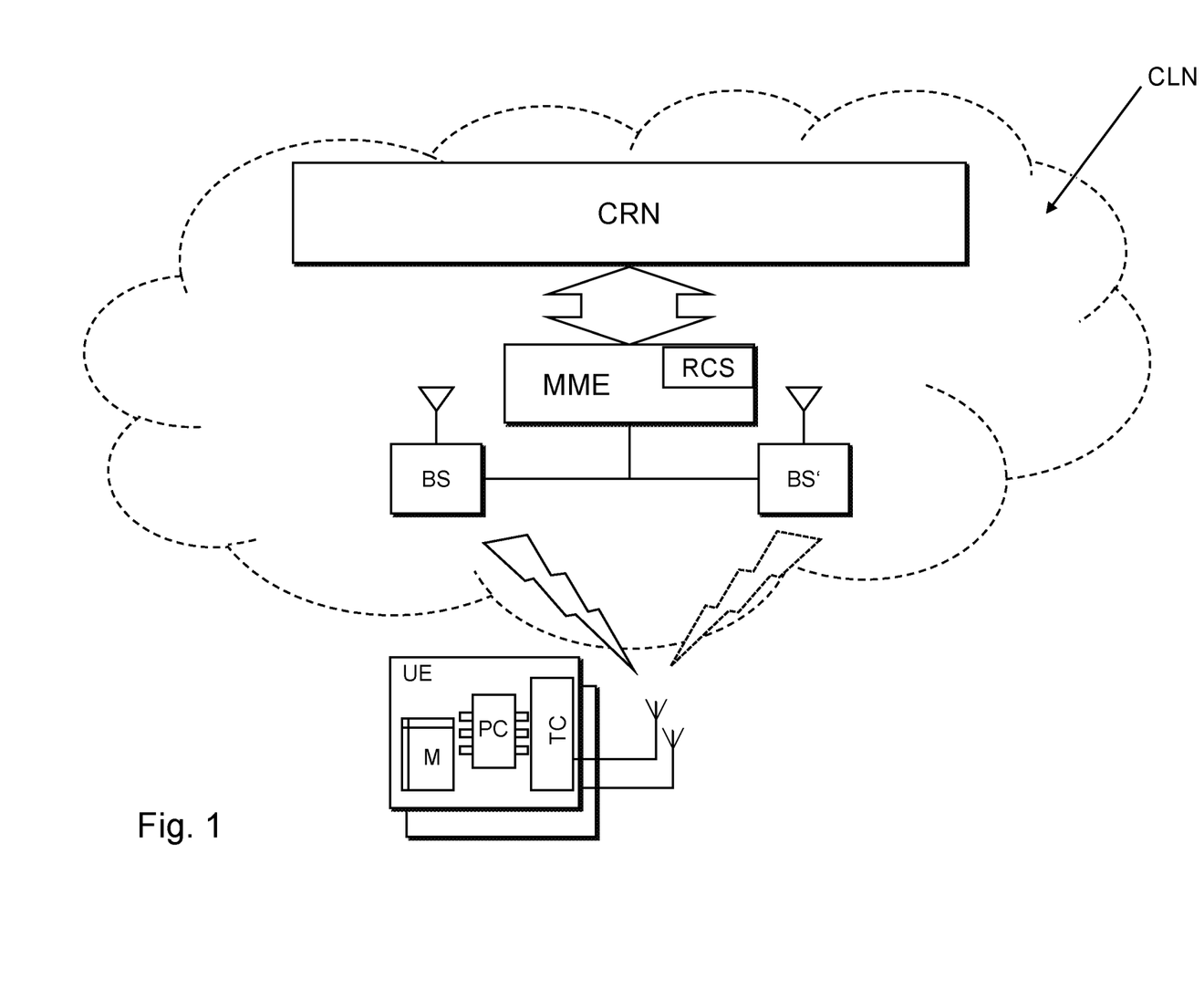
FIG. 1 represents the architecture of the apparatuses to which the present invention is applied to as an embodiment.

FIG. 1 schematically shows an embodiment of the apparatuses of present invention. The user equipment UE is configured to operate in a cellular network CLN by means of at least one base node BS.

The user equipment UE of this embodiment comprises processor circuitry PC, like a CPU or other types of processors. The processor is configured to execute computer programs which are stored in the memory M of the user equipment.

The processor is at least dedicated for controlling the transceiver circuitry TC. The transceiver circuitry comprises both receiver circuitry and transmitter circuitry for wireless communication with at least one base node of a cellular network. For this it additionally makes use of the antenna AN. In alternative embodiments transceiver and receiver circuitry are separate components of the user equipment UE.

By means of the antenna AN the user equipment is configured to access the active base node BS, which is the base node the user equipment is currently camping on. The camping relationship is indicated with the solid line lightning.

The exemplifying cellular network CLN supports a technology standard beyond 4G/LTE, in particular 5G resp. New Radio (NR). Typically the cellular network comprises additional radio access networks, which are not shown.

The base nodes are dedicated to support the respective technology standard, typically base nodes of technology standards LTE and beyond are called eNodeBs.

The cellular network CLN at least comprises a plurality of base nodes BS, BS' each covering a cell area of the coverage region. The base nodes are connected to at least one cellular network component, which is the control node for managing the access between base node and core network CRN, as in the exemplifying embodiment the mobile management entity MME. Preferably the mobile management entity MME further comprises the reconfiguration server RCS which has the task to instruct the base nodes assigned to the mobile management entity.

When the user equipment UE is operating in an area where at least two base nodes BS, BS' are available, it has the choice to select one of the base nodes, which fulfils the requirements of the user equipment best.

The user equipment is in particular an apparatus configured to operate in one of the 5G scenarios for machine type communication (MTC), in particular:

mMTC (Massive Machine Type Communication),
uMTC (ultra-reliable Machine Type Communication), or
hDTD (high data throughput devices).

The base node consequently is configured to provide the frame structure setting for the respective scenario. In case of another UE camping on the same base node, but expecting another frame structure setting of another 5G scenarios, then the base node is supposed to provide the frame structure setting for both scenarios within one of its supported frequency bands.

Figure 2:
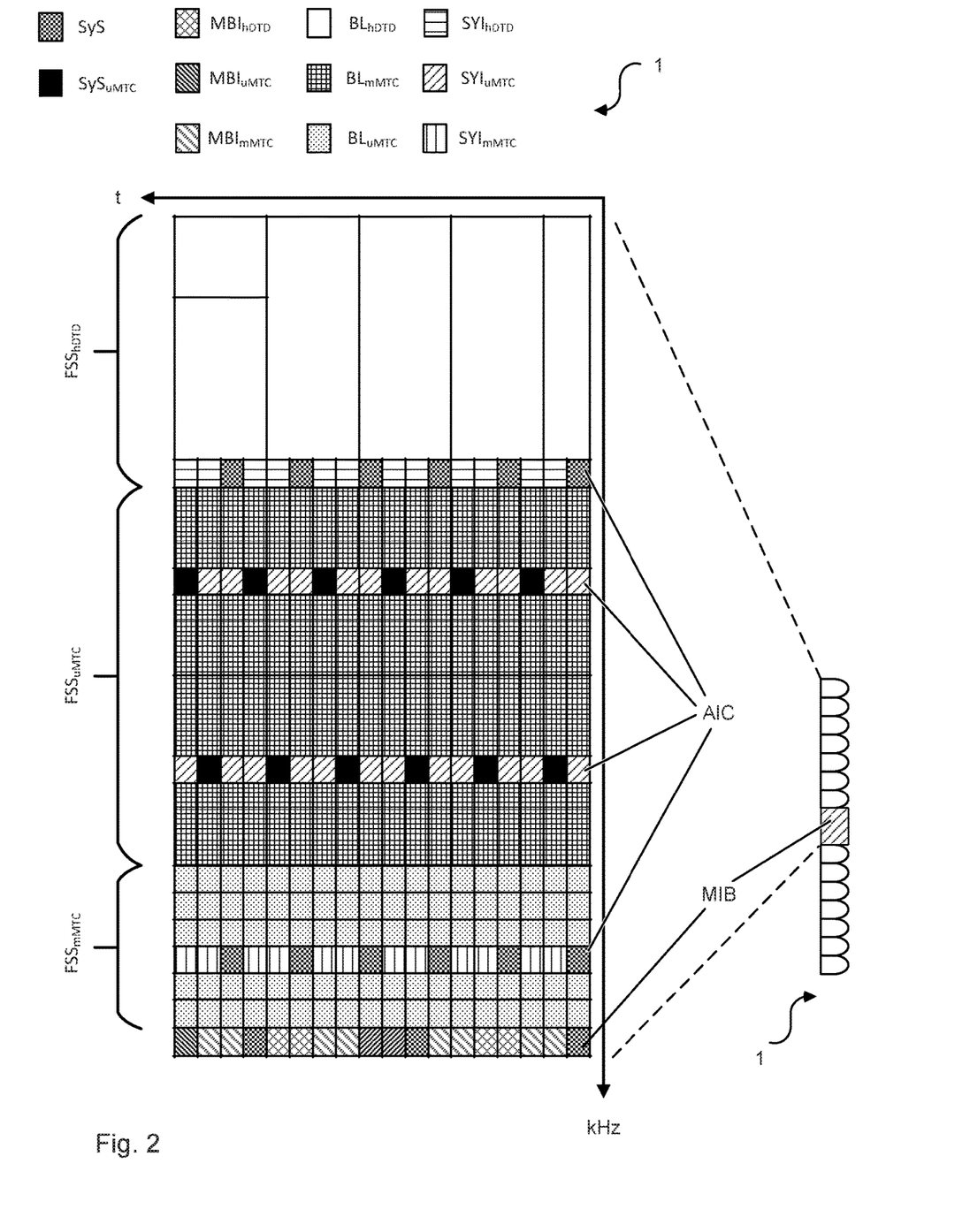
FIG. 2 schematically represents the frame structure according to an exemplifying embodiment of the invention.

FIG. 2 shows the frame structure 1 of said base node BS according to an exemplifying embodiment of the invention.

The showed frame structure is an illustrative snapshot-like example of a frame structure according to the inventive method.

The frame structure for the supported frequency band is divided in subcarrier typically each covering 15 kHz (according to LTE oriented frame structure, for 5G other subcarrier size may be defined). In direction of the time the transmissions are subdivided in subframes, slots and OFDM symbols. One subframe consists of two slots, and each slot consists from 7 OFDM symbols. A resource block has a duration of one subframe. In the center of the frequency band the master information block MIB is situated. The master information block comprises in particular the broadcast channel BCH and scheduling information for the frequency band.

According to the inventive method the frequency band is divided—at least for a given time, resp., for a given number of subframes—in at least two frame structure setting each representing one of the scenarios mentioned above.

It is expected that for 5G the same frame structure as for 4G will be in principle reused. In case modifications are foreseen, the inventive method is able to take this into account.

In this exemplifying structure three frame structure settings are visible: $FSS_{hDTD}$, $FSS_{uMTC}$, $FSS_{mMTC}$, each frame structure setting belonging to one of the 5G scenarios. Other settings for other scenarios are possible and foreseen as part of the invention. At the same time also only one, two or four or more frame structure settings might be available.

The MIB comprises besides Synchronization Signals (SyS) Master Broadcast channel information $MBI_{hDTD}$, $MBI_{mMTC}$, $MBI_{uMTC}$ for each of the currently available frame structure setting. These Master Broadcast channel information indicate at what frequency the access information channel AIC for each of the currently active frame structure settings is situated.

Consequently if a certain frame structure setting is currently not available, then no Master Broadcast channel Information referring to the respective missing frame structure setting is available in the MIB. Hence, a camping user equipment receiving the MIB has an indication that this missing frame structure setting is currently not available. Alternatively this information is otherwise provide, e.g. in system information blocks (SIBs) in the BCH.

Each access information channel AIC comprises the scheduling information for the respective frame structure setting. Preferably the AIC is located adjacent resp. among the subcarriers assigned to the respective frame structure setting.

As it can be seen, for $FSS_{uMTC}$ two frequency sections are reserved, and consequently each of the frequency sections has its own AIC.

The frame structure settings are configured to serve the respective scenario. As it can be seen, the $FSS_{hDTD}$, which is reserved for high data throughput devices, provides resource blocks $BL_{hDTD}$ with a higher block size. Here, with less configuration signalling overhead, large amounts of payload can be transmitted. Here the block size is even larger than one subframe. For $FSS_{uMTC}$ at least blocks $BL_{uMTC}$ covering a plurality of subcarriers are foreseen. With that higher redundancy without time impact can be achieved. Apart from the block size also other scheduling parameter are foreseen to be individually different per frame structure setting, e.g. the TTI duration, HARQ delay times, or the coding scheme.

Normally the base node is configured to provide the requested frame structure settings automatically, resp. with the support from the reconfiguration server resp. the MME. That means a user equipment receives the system information or another broadcast from the base node indicating the currently available frame structure settings. If the user equipment is bound to a certain frame structure setting, it is barred from accessing the base node as long as the required frame structure setting is not supported.

Alternatively the system information may further indicate at what time, e.g. in terms of an subframe offset, the missing frame structure setting is available. In both cases, when the user equipment has the need to immediately camp on a base node and perform a data exchange by means of the requested frame structure setting, then it needs to switch to another base node which currently has this frame structure setting available. Preferably the system information of the current base node indicate neighbor base nodes supporting the requested frame structure setting.

Figure 3:
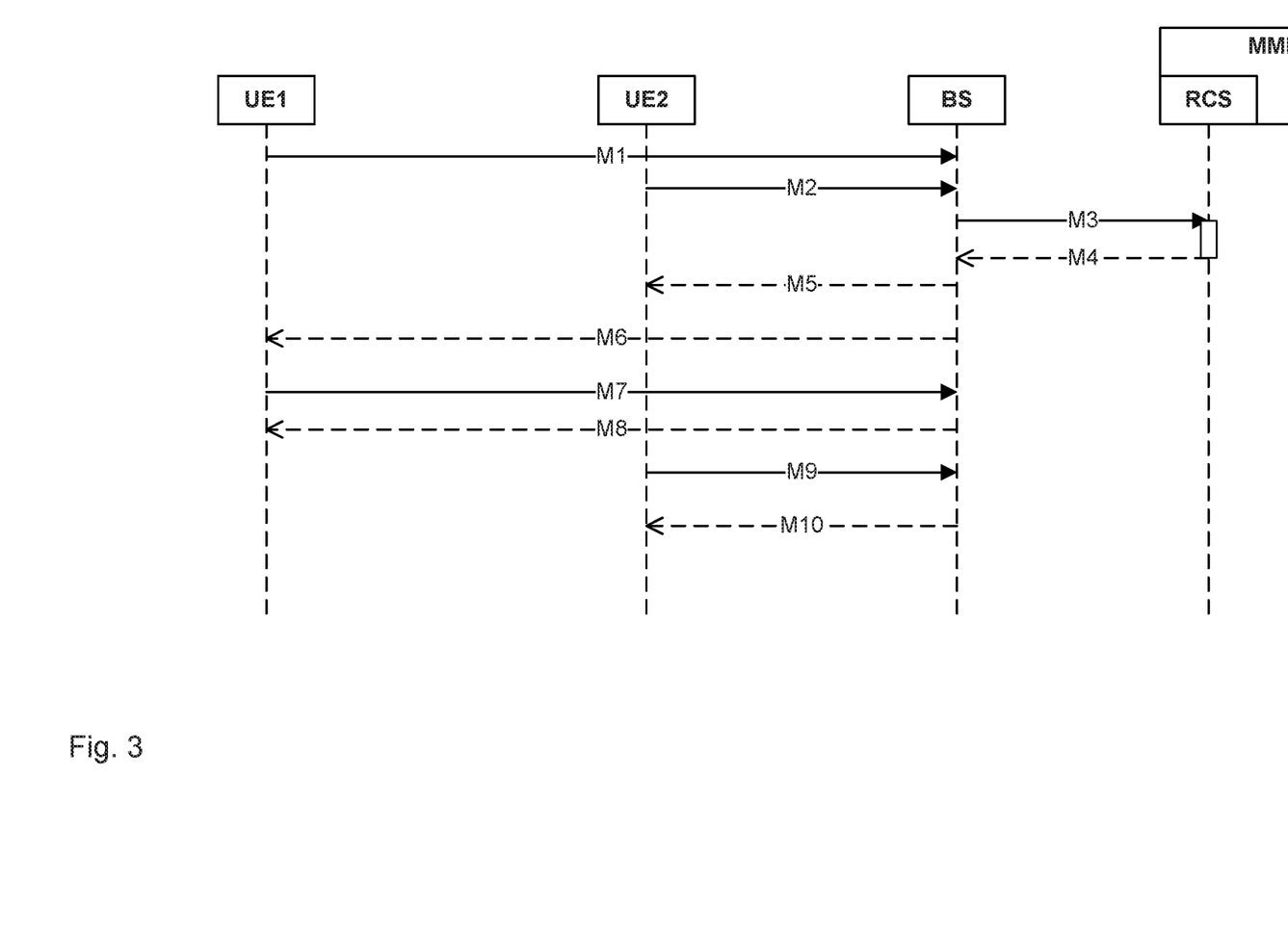
FIG. 3 shows a sequence diagram of an exemplifying embodiment of the inventive method.

FIG. 3 shows an exemplifying sequence diagram for an alternative embodiment of the invention, involving two user equipments UE1, UE2 camping on a base node BS. Through the Master Information Block they get the information about which frame structure settings are currently provided by the base node BS. If the base node BS does not support a requested frame structure setting, the exemplifying message flow as follows is executed as an advantageous embodiment of the invention.

User equipments UE1 and UE2 requesting with messages M1 and M2 from the base node to operate in a frame structure setting which is currently not available. In this exemplifying case both user equipments requesting the same frame structure setting.

The base node BS is collecting such request messages from camping user equipments. When a predefined number of request messages is not achieved within a given time frame, the base node informs the requesting user equipments that the frame structure setting is not available within the foreseeable period of time, e.g. an hour from now. Consequently the user equipments can reselect to other base nodes which currently support the requested frame structure setting.

When the predefined number of requesting user equipments for a specific frame structure setting is achieved however, the base node could according to an exemplifying embodiment activate the requesting frame structure setting. Preferably the base node sends such requests, respectively the information regarding that the predefined number of request for a frame structure setting is reached, as a message M3 to the reconfiguration server RCS being part of the MME.

The reconfiguration server RCS in response to said message decides about the configuration and sends its response with message M4 to the base node. In the shown example the RCS decides to adopt the frame structure of the base node to activate the requested frame structure setting. Other frame structure settings might therefore be deactivated or diminished in the number of subcarrier reserved for the frame structure setting.

In identifying the assigned number of reserved subcarriers for the frame structure setting the reconfiguration server preferably considers the number of requesting user equipments.

Consequently the base node informs the requesting user equipments with messages M5 and M6 about the accepted request. Such messages may be direct responses on the request message M1, M2. Alternatively the response may be indicated by changes in the system information broadcasted to all user equipment camping on the base node, preferably as part of the Master Information Block MIB. The latter option is advantageous in that sense that consequently all camping user equipments need to know which frame structure settings are currently supported. This would be achieved with the common way by means of the system information.

The Master information block now provides an indication to the access information channel AIC of the newly setup frame structure setting. Hence the new frame structure setting is then reachable for the user equipments. Consequently the user equipments UE1 and UE2 request with messages M7, M9 connections using the activated frame structure setting, and with messages M8, M10 the base node BS confirms the setup of the connection. In an alternative embodiment the reconfiguration server collects such messages M3 from the base nodes connected to the MME. Out of such requests the reconfiguration server then is capable of brokering the different user equipments, in particular in regions with high density of base nodes. That means, the reconfiguration server instructs at least some of the available base nodes to configure a frame structure setting according to the instruction. Such measure leads to a distribution of the frame structure settings over different base nodes. Consequently the reconfiguration server lets the base nodes inform the camping user equipments, in particular those whose frame structure setting requirement will not be fulfilled on the active base node, about the available base nodes around that support the requested frame structure setting.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for data transmission in a 5G cellular network for wireless communication, comprising at least a base node, to at least diverse user equipments camping on said base node, the diverse user equipments providing different requirements towards cellular network signalling capabilities, the diverse user equipments thus requiring different 5G scenarios for machine type communication, having different frame settings reserving a part of a frequency band, the method comprising steps for the base node of:

transmitting in at least one frequency band at least two frame structure settings serving two 5G scenarios and a common master information block, the common master information block comprising data fields indicating an access information channel for at least one of the at least two frame structure settings serving a given 5G scenario in the at least one frequency band, said data fields comprising an indication where, in the at least one frequency band, the access information channel for the at least one of the at least two frame structure settings is situated, wherein the access information channel for the at least one of the at least two frame structure settings serving the given 5G scenario provides access information indicating scheduling parameters of the at least one of the at least two frame structure settings and the at least one frequency band reserved to the at least one of the at least two frame structure settings serving the given 5G scenario, transmitting user relevant data in the at least one frequency band configured according to said at least one of the at least two frame structure settings serving the given 5G scenario, transmitting system information, the system information comprising at least an indication that frame structure settings are available on request, and upon reception of a predetermined number of requests from user equipments relating to a specific frame structure setting, configuring the at least one of the at least two frame structure settings.

2. The method according to claim 1, wherein the at least one of the at least two frame structure settings comprises a transmission scheme different from a transmission scheme of at least one other of the at least two frame structure settings used in parallel.

3. The method according to claim 2,
wherein at least one frame structure settings transmission scheme comprises at least one of:
at least one structure block composed of a plurality of basic resourceblocks,
HARQ delay requirements for at least one of uplink or downlink transmissions.

4. The method according to claim 1,
further comprising a step for the base node of transmitting the system information comprising an indication relating to a current availability of the at least one of the at least two frame structure settings.

5. The method according to claim 4,
wherein said system information further comprises an indication relating to a time when a non-available frame structure setting will be available.

6. The method according to claim 4,
wherein said system information further comprises an indication relating to barring user equipments supporting only a non-available frame structure setting.

7. The method according to claim 1,
wherein the 5G cellular network further comprises a reconfiguration server, operatively connected to a plurality of base nodes and to a core network of the 5G cellular network,
the method further comprising steps for the reconfiguration server of:
receiving from at least one base node at least one message indicating reception of said predetermined number of requests from user equipments relating to a specific frame structure setting at said at least one base node,
instructing one of said plurality of base nodes to configure the specific frame structure setting.

8. A base node, of a 5G cellular network, comprising transceiver circuitry configured to wirelessly communicate with at least diverse user equipments camping on the base node, the diverse user equipments providing different requirements towards cellular network signalling capabilities, the diverse user equipments thus requiring different 5G scenarios for machine type communication having different frame settings reserving a part of a frequency band, wherein the base node further comprises processing circuitry configured to:
transmit in at least one frequency band at least two frame structure settings serving two 5G scenarios and common master information block, the common master information block comprising data fields indicating an access information channel for at least one of the at least two frame structure settings serving a given 5G scenario in the at least one frequency band, said data fields comprising an indication where in the at least one frequency band the access information channel for the at least one of the at least two frame structure settings is situated,
wherein the access information channel for the at least one of the at least two frame structure settings provides access information indicating scheduling parameters of the at least one of the at least two frame structure settings and the at least one frequency band reserved to the at least one of the at least two frame structure settings serving the given 5G scenario,
transmit payload data in the at least one frequency band scheduled according to said at least one of the at least two frame structure settings serving the given 5G scenario,
transmit system information, the system information comprising at least an indication that frame structure settings are available on request,
and upon reception of a predetermined number of requests from user equipments relating to a specific frame structure setting, configure the at least one of the at least two frame structure settings.

9. The base node according to claim 8,
wherein the at least one of the at least two frame structure settings comprises a transmission scheme different from a transmission scheme of at least one other of the at least two frame structure settings used in parallel, at least one of the transmission scheme of the at least one of the at least two frame structure settings and the transmission scheme of the at least one other of the at least two frame structure settings comprise at least one of:
at least one structure block composed of a plurality of basic resourceblocks,
HARQ delay requirements for at least one of uplink or downlinktransmissions.

10. The base node according to claim 8,
wherein the base node is further configured to transmit system information comprising an indication relating to a current availability of the at least one of the at least two frame structure settings.

11. A user equipment configured to camp on a base node of a 5G cellular network, said user equipment providing requirements towards cellular network signalling capabilities, thus requiring a given 5G scenario for machine type communication having frame settings reserving a part of a frequency band,
wherein the user equipment comprises a processor configured to decode:
signals transmitted by the base node in at least one frequency band in a frame structure setting of a plurality of frame structure settings serving a plurality of scenarios, wherein the frame structure setting serves the given 5G scenario, and
a common master information block, the common master information block comprising data fields indicating an access information channel for said frame structure setting serving the given 5G scenario in the at least one frequency band,
said data fields comprising an indication where in the at least one frequency band the access information channel for the frame structure setting is situated,
wherein the access information channel for said frame structure setting provides access information indicating scheduling parameters of the frame structure setting and the at least one frequency band reserved to said frame structure setting serving the given 5G scenario,
and the user equipment is further configured to receive user relevant data in the at least one frequency band scheduled according to said frame structure setting serving the given 5G scenario,
and the user equipment is further configured to receive system information, the system information comprising at least an indication that frame structure settings are available on request,
and to transmit to the base node requests relating to a specific frame structure setting.

12. The user equipment according to claim 11, further configured to receive the system information transmitted by the base node indicating an availability of said frame structure setting, and to wait until the frame structure setting is available, in case the system information comprise an indication relating to a time when a non-available frame structure setting will be available.

\* \* \* \* \*